United States Patent
Duerig et al.

(10) Patent No.: US 9,977,050 B2
(45) Date of Patent: May 22, 2018

(54) WEAR-LESS OPERATION OF A MATERIAL SURFACE WITH A SCANNING PROBE MICROSCOPE

(75) Inventors: Urs T. Duerig, Switzerland (CH); Bernd W. Gotsmann, Switzerland (CH); Armin W. Knoll, Switzerland (CH); Mark Alfred Lantz, Switzerland (CH)

(73) Assignee: SWISSLITHO AG, Zurich (CH)

( * ) Notice: Subject to any disclaimer, the term of this patent is extended or adjusted under 35 U.S.C. 154(b) by 1072 days.

(21) Appl. No.: 12/940,079

(22) Filed: Nov. 5, 2010

(65) Prior Publication Data
US 2011/0113517 A1 May 12, 2011

(30) Foreign Application Priority Data
Nov. 6, 2009 (EP) .................................. 09175320

(51) Int. Cl.
*G01Q 70/08* (2010.01)
*G01Q 60/36* (2010.01)
(Continued)

(52) U.S. Cl.
CPC ............ *G01Q 60/363* (2013.01); *B82Y 35/00* (2013.01); *G01Q 70/10* (2013.01)

(58) Field of Classification Search
CPC ........ G01Q 10/00; G01Q 10/02; G01Q 10/04; G01Q 20/00; G01Q 30/00; G01Q 40/00;
(Continued)

(56) References Cited

U.S. PATENT DOCUMENTS 5,450,746 A * 9/1995 Howard ................. B82Y 35/00
73/105
6,459,088 B1 * 10/2002 Yasuda et al. ........... 250/442.11
(Continued)

FOREIGN PATENT DOCUMENTS

EP         1995737 A1    11/2008
WO    WO2007/095360 A2    8/2007

OTHER PUBLICATIONS

A. Socoliuc, et al., Atomic-Scale Control of Friction by Actuation of Nanometer-Sized Contacts, Science, 2006, 207, 313.
(Continued)

*Primary Examiner* — Jason McCormack
(74) *Attorney, Agent, or Firm* — Tutunjian & Bitetto, P.C.

(57) ABSTRACT

A method and a scanning probe microscope (SPM) for scanning a surface of a material. The method and SPM have a cantilever sensor configured to exhibit both a first spring behavior and a second, stiffer spring behavior. While operating the SPM in contact mode, the sensor is scanned on the material surface and a first spring behavior of the sensor (e.g. a fundamental mode of flexure thereof) is excited by deflection of the sensor by the material surface. Also while operating the SPM in contact mode, excitation means are used to excite a second spring behavior of the sensor at a resonance frequency thereof (e.g. one or more higher-order resonant modes) of the cantilever sensor to modulate an interaction of the sensor and the material surface and thereby reduce the wearing of the material surface.

18 Claims, 3 Drawing Sheets

(51) Int. Cl.
*B82Y 35/00* (2011.01)
*G01Q 70/10* (2010.01)

(58) Field of Classification Search
CPC ........ G01Q 60/00; G01Q 60/02; G01Q 60/28;
G01Q 60/26; G01Q 60/32; G01Q 60/34;
G01Q 60/36; G01Q 60/363
USPC .............................................. 73/105; 977/863
See application file for complete search history.

(56) References Cited

U.S. PATENT DOCUMENTS

| | | | | |
|---|---|---|---|---|
| 6,487,515 | B1* | 11/2002 | Ghoshal | 702/136 |
| 6,945,099 | B1* | 9/2005 | Su | B82Y 35/00 73/105 |
| 2004/0126073 | A1* | 7/2004 | Chiba et al. | 385/123 |
| 2004/0206165 | A1* | 10/2004 | Minne et al. | 73/105 |
| 2006/0156798 | A1* | 7/2006 | Mancevski | 73/105 |
| 2006/0213261 | A1* | 9/2006 | Salapaka et al. | 73/105 |
| 2006/0260388 | A1* | 11/2006 | Su | G01Q 60/34 73/105 |
| 2007/0012093 | A1* | 1/2007 | Kwon et al. | 73/105 |
| 2007/0214864 | A1* | 9/2007 | Proksch | 73/1.79 |
| 2008/0316904 | A1* | 12/2008 | Duerig | G01Q 70/00 369/126 |
| 2009/0070904 | A1* | 3/2009 | West et al. | 850/5 |
| 2010/0011471 | A1* | 1/2010 | Jesse et al. | 850/21 |
| 2010/0017923 | A1* | 1/2010 | Pittenger et al. | 850/21 |
| 2010/0257644 | A1* | 10/2010 | Turner et al. | 850/8 |
| 2011/0271412 | A1* | 11/2011 | Rychen | 850/21 |

OTHER PUBLICATIONS

Z. Elkalour, et al., Bundle Formation of Polymers with an Atomic Force Miscroscope in Contact Mode: A Friction Versus Peeling Process, Phys. Rev Lett., 1994, 3231, 73-24.

R. Kaneko and E. Hamada, Mocrowear Processes of Polymer Surfaces, Wear, 1993, 162-164, 370.

O.M. Leung and C. Goh, Orientational Ordering of Polymers by Atomic Force Microscope Tip-Surface Interation, Science, 1992, 64, 255.

J. J. Martinez, M. Teresa Cuberes, Energy Dissipation in the Mechanical-Diode Jump of a Nanoscale Contact, Mater. Res. Soc. Symp. Proc., 2008, 32-35, 1085-T05-14.

M. A. Lantz, et al., Dynamic Superlubricuty and the Elimination of Wear on the Nanoscale, Nature Nanotechnology, Aug. 2, 2009, 586-590, 4.

H. Pozidis, et al., Demonstration of Thermomechanical Recording at 641 Gbit/in2, IEEE Trans. Magn., 2004, 2531-2536, 40.

H. Rothuizen, et al., Design of Power-Optimized Thermal Cantilevers of Scanning Probe Topography Sensing, Proc. IEEE 22nd Int'l Conf. on Micro Electro Mechanical Systems, 2009, 603-606, Sorrento, Italy.

* cited by examiner

WEAR-LESS OPERATION OF A MATERIAL SURFACE WITH A SCANNING PROBE MICROSCOPE

CROSS REFERENCE TO RELATED APPLICATION

This application claims priority under 35 U.S.C. 119 from European Application 09175320.2, filed Nov. 6, 2009, the entire contents of which are hereby incorporated by reference.

BACKGROUND OF THE INVENTION

Field of the Invention

The present invention relates to the field of probe-based methods for scanning and imaging the surface of a material. In particular, the invention is directed to fast raster scan imaging of delicate samples under low load conditions.

Description of Related Art

Scanning probe microscopy (SPM) techniques rely on using a physical probe in close proximity with a sample surface to scan the sample surface while controlling interactions between the probe and the surface. An image of the sample surface can thus be obtained, typically in a raster scan of the sample. In the raster scan the probe-surface interaction is recorded as a function of position and images are produced as a two-dimensional grid of data points.

The lateral resolution achieved with SPM varies with the underlying technique: atomic resolution can be achieved in some cases. Use can be made of piezoelectric actuators to execute scanning motions with precision and accuracy, at a length scale up to atomic or better. The two main types of SPM are the scanning tunneling microscopy (STM) and the atomic force microscopy (AFM). In the following, acronyms STM/AFM may refer to either the microscopy technique or to the microscope itself.

In particular, an AFM is a device in which the topography of a sample is modified or sensed by a probe mounted on the end of a cantilever. As the sample is scanned, interactions between the probe and the sample surface cause pivotal deflections of the cantilever. The topography of the sample may thus be determined by detecting the deflection of the probe.

Furthermore, as explained on the WWW pages of the National Institute of Standards and Technology (NIST), see bfrl.nist.gov/nanoscience/BFRL_AFM.htm, in AFM, the probe usually includes a sharp tip (nominal tip radius on the order of 10 nm) located near the end of the cantilever beam. The tip is raster scanned across the sample surface using, for example, piezoelectric scanners. Changes in the tip-sample interaction are often monitored using an optical lever detection system, in which a laser beam is reflected off of the cantilever and onto a position-sensitive photodiode. When scanning, a particular operating parameter is maintained at a constant level, and images are generated through a feedback loop between the optical detection system and the piezoelectric scanners. For a scanning stylus atomic force microscope, the probe tip is scanned above a stationary sample, while in a scanning sample design, the sample is scanned below a fixed probe tip.

Applications of AFM and other types of SPM are growing rapidly and include biological materials (e.g., studying DNA structure), polymeric materials (e.g., studying morphology, mechanical response, and thermal transitions), and semiconductors (e.g., detecting defects). In particular, AFM can be utilized to evaluate the surface quality of products such as contact lenses, optical components and semiconductor wafers after various cleaning, etching, or other manufacturing processes.

Three main imaging modes are known which can be used to obtain topographic images: contact mode, non-contact mode, and intermittent contact or tapping mode.

In contact mode, the probe is dragged across the surface. A constant flexure, or bend in the cantilever is maintained, which corresponds to a displacement of the probe tip relative to the undeflected position of the cantilever. As the topography of the surface changes, the relative position of the tip with respect to the sample must be moved to maintain this constant deflection. The topography of the surface can thus be mapped using this feedback mechanism; it is assumed that the motion of the z-scanner corresponds to the sample topography. To minimize the amount of applied force used to scan the surface, low spring constant (e.g. $k<1$ N/m) probes are used. However, significant deformation and damage of soft samples (e.g., biological and polymeric materials) often occurs during contact mode imaging (especially in air due to the force to be applied to overcome surface contamination). The combination of the applied normal force, the lateral forces resulting from dragging the probe tip across the sample, and the small contact areas involved result in contact stresses that can damage the sample, the tip, or both.

To overcome this limitation, contact mode imaging can be performed within a liquid environment, which lowers the deformation and damage problems by allowing the use of lower contact forces. Yet, imaging samples in a liquid environment is not always possible or practical.

To reduce the damages inherent to contact mode imaging, the cantilever can be oscillated near its first (or fundamental) bending mode resonance frequency (e.g. on the order of 100 kHz) as the probe is raster scanned above the surface in either non-contact mode or tapping mode.

In non-contact mode, both the tip-sample separation and the oscillation amplitude are on the order of 1 nm to 10 nm, such that the tip oscillates just above the surface, essentially imaging the surface of the sample. The resonance frequency and amplitude of the oscillating probe decrease as the sample surface is approached due to long-range forces extending above the surface (e.g. Van der Waals). Either a constant amplitude or constant resonance frequency can be maintained through a feedback loop with the scanner and, just as in contact mode, the motion of the scanner is used to generate the surface image. To reduce the tendency for the tip to be pulled down to the surface by attractive forces, the cantilever spring constant is normally much higher compared to contact mode cantilevers. The combination of weak forces affecting feedback and large spring constants causes the non-contact AFM signal to be small, which leads to unstable feedback and requires slower scan speeds than either contact mode or tapping mode. Also, the lateral resolution in non-contact mode is limited by the tip-sample separation and is normally lower than that in either contact mode or tapping mode.

Tapping mode tends to be more applicable to general imaging in air, particularly for soft samples, as the resolution is similar to contact mode, whereas the forces applied to the sample are lower and less damaging. A main disadvantage of the tapping mode relative to contact mode is the slower scan speed.

In tapping mode, the cantilever oscillates close to its first (fundamental) bending mode resonance frequency, as in non-contact mode. However, the oscillation amplitude of the probe tip is much larger than for non-contact mode, often in the range of 20 nm to 200 nm, and the tip makes contact with the sample for a short duration in each oscillation cycle. As the tip approaches the sample, the tip-sample interactions alter the amplitude, resonance frequency, and phase angle of the oscillating cantilever. During scanning, the amplitude at the operating frequency is maintained at a constant level, called the set-point amplitude, by adjusting the relative position of the tip with respect to the sample. In general, the amplitude of oscillation during scanning is large enough such that the probe maintains enough energy for the tip to tap through and back out of the surface.

As said, one of the main disadvantages of scanned probes in general, and atomic force microscopy (AFM) in particular, is the relatively low scanning speed. There is a trade-off between scanning speed and wear reduction, especially when the aim is to reduce damage of the surface to be imaged by the probe. In general, the methods that achieve reduction of sample damage tend to slow down the scanning process. These methods mostly rely on avoiding sliding friction, using dynamic techniques, such as the tapping or non-contact modes described above. On the contrary, techniques such as contact mode AFM are potentially much faster, but they are less suitable for imaging delicate surfaces.

BRIEF SUMMARY OF THE INVENTION

To overcome these deficiencies, the present invention provides a method for scanning a surface of a material with a scanning probe microscope (SPM), the SPM having a cantilever sensor configured to exhibit both a first spring behavior and a second, stiffer spring behavior, the method including: operating the SPM in contact mode, whereby the sensor is scanned on the material surface and the first spring behavior is excited by a deflection of the sensor by the material surface; and exciting by excitation means the second spring behavior at a resonance frequency thereof, to modulate an interaction of the sensor and the material surface.

In another aspect, the present invention provides a scanning probe microscope (SPM), capable of operating in contact mode, including: a cantilever sensor configured to exhibit both a first spring behavior and a second, stiffer spring behavior, wherein the first spring behavior is excited into a fundamental mode upon deflection of the sensor when scanning a material surface in contact mode; and excitation means adapted to excite the second spring behavior at a higher order resonance mode thereof, in order to modulate an interaction of the sensor and the material surface.

In yet another aspect, the present invention provides a method for scanning a surface of a material with a scanning probe microscope (SPM), the SPM having a cantilever sensor configured to exhibit both a first spring behavior and a second, stiffer spring behavior, the method including: operating the SPM in contact mode, whereby the sensor is scanned on the material surface and the first spring behavior is excited by a deflection of the cantilever sensor by the material surface exciting a fundamental mode of flexure of the cantilever sensor; and exciting by excitation means the second spring behavior at a higher order resonant mode of the cantilever sensor, to modulate an interaction of the sensor and the material surface, wherein a spring constant associated with the first spring behavior is less than 1 N/m, and a spring constant associated with the second spring behavior is greater than 10 N/m, wherein the cantilever sensor has a body and an end section, wherein the end section is designed for sensing the material surface and exhibiting flexibility with respect to the body, such as to provide both first and second spring behaviors, wherein the end section comprises a capacitive element, wherein the step of exciting the second spring behavior includes applying and modulating a potential between the capacitive element and either the material or an underlying layer, via the excitation means, and at a frequency associated with the higher-order resonant mode, whereby at the step of exciting, the excitation means comprises a radio frequency generator inductively coupled by means of a high-bandwidth ferrite core transformer to a bias voltage applied to the material, wherein the end section has a read sensor subsection, the read sensor being adapted for thermoelectrically measuring relative motion of the cantilever sensor with respect to the material surface, wherein the cantilever end section is terminated by a tip, and the end section area and the tip height are selected to have a Q-factor between 5 and 10.

DETAILED DESCRIPTION OF THE PREFERRED EMBODIMENTS

The embodiments described herein combine fast AFM imaging (without active feedback) with a simultaneous modulation of the contact force, hereafter termed "dithering".

A first spring behavior of the cantilever sensor is used to keep the tip in contact with the sample during scanning. Concurrently, a second spring behavior of the cantilever sensor is excited, in order to modulate an interaction of the sensor and the material surface and thereby reduce the wearing of the material surface.

The spring behaviors at stake can be respectively provided by:

1. The fundamental, resonant flexure (or bending) mode of the cantilever sensor; and
2. One higher resonant mode or more.

Although distinct springs can be mounted in series to achieve the said behaviors, the embodiment described below is a dual cantilever-spring (holding the probe tip).

The method of the present embodiment allows for combining the high bandwidth/fast scanning capability of contact mode imaging with the advantages of wear reduction, using an actuated tip (as in dynamic modes of operation).

Typically, the first spring is soft (to be able to minimize contact forces) and has reasonably high resonant frequency (to allow fast motion of the tip). This spring can be used to control/measure the tip as it follows the surface in contact mode. The second spring has a higher resonant frequency and a higher stiffness. It can be selectively actuated to induce vibration with small amplitude, typically on the order of 1 nm. This motion is responsible for a reduction of wear of the surface.

It has previously been reported that surface friction [A. Socoliuc, E. Gnecco, S. Maier, O. Pfeiffer, A. Baratoff, R. Benewitz, and E. Meyer, Science 313, 207 (2006)] and tip wear [M. A. Lantz, D. Wiesmann, and B. Gotsmann, Nature Nanotechnol. 4, 586 (2009)] are reduced by exciting the tip at frequencies significantly above the fundamental resonance.

Here, it is demonstrated that higher-order mode excitation also provides a powerful non-invasive imaging technique. In particular it is shown that soft polymer samples can be imaged at high speeds without inducing wear patterns on the surface as are commonly observed in normal contact-mode imaging. In this respect, one may refer to the following references:
1. O. M. Leung and C. Goh, Science 255, 64 (1992).
2. R. Kaneko and E. Hamada, Wear 162-164, 370 (1993).
3. Z. Elkaakour, J. P. Aime, T. Bouhacina, C. Odin, and T. Masuda, Phys. Rev Lett. 73, 3231 (1994).

The present embodiment of the cantilever sensor is configured such that, when operating in contact mode, the material surface deflects it such as to merely excite its fundamental flexure mode. Exciting one or more higher-order modes provides the second spring behavior.

Figure 1:
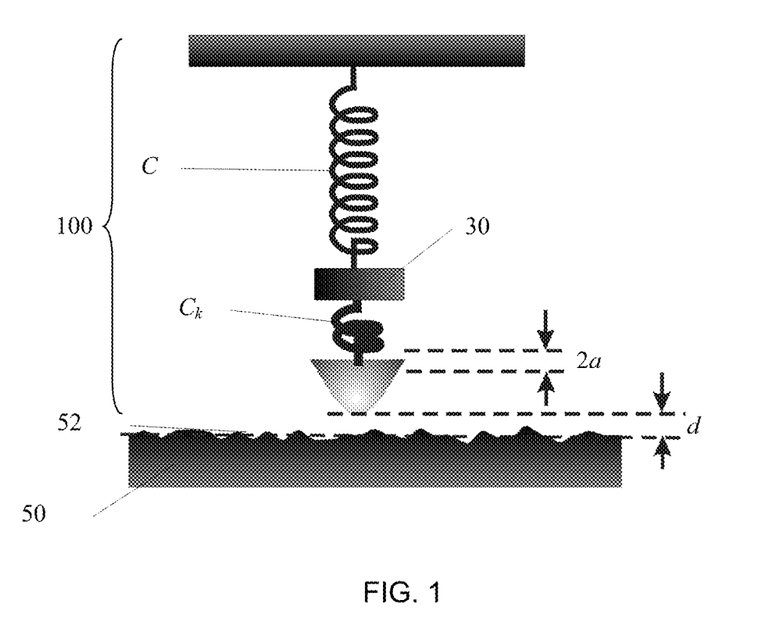
FIG. 1 depicts a model of a cantilever sensor as operated in embodiments of the invention.
Figure 2:
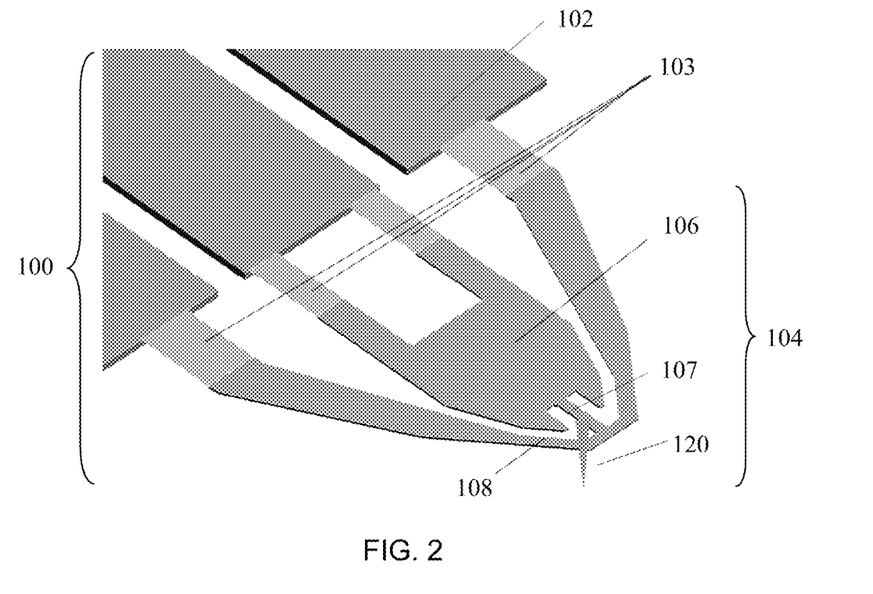
FIG. 2 is a schematic representation of a cantilever sensor as operated in embodiments of the invention.
Figure 3:
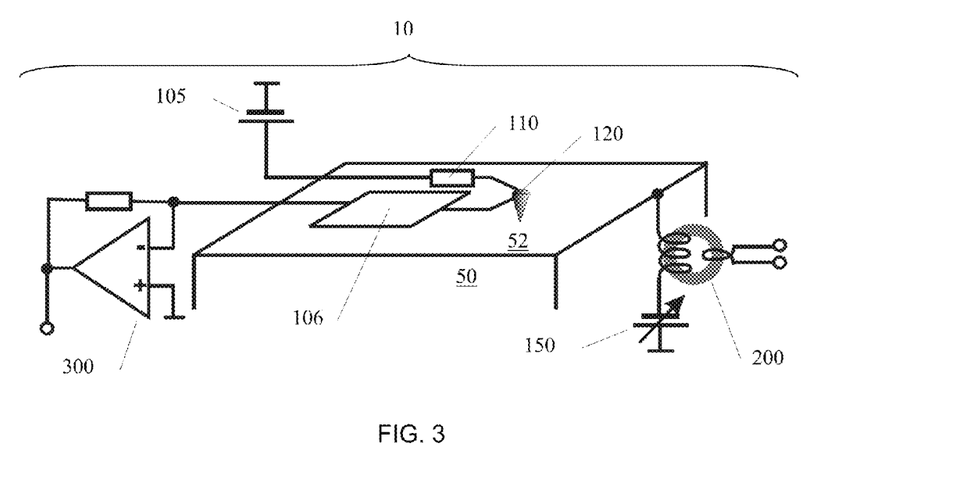
FIG. 3 is a schematic set-up for an atomic force microscope as operated in embodiments of the invention.

In this respect, FIG. 1 depicts a possible model of cantilever sensor 100, wherein a soft spring C represents the first spring, i.e. the static bending mode, and a stiff spring, $C_k$, represents the high-order mode(s). FIGS. 2 and 3 show schematics of the cantilever force sensor and an experimental set-up, respectively.

Referring to FIG. 1: the high-order mode can be modelled by a harmonic spring oscillator, $C_k$, suspended from a soft spring, C, which represents the static bending mode. The latter acts as a large inertial mass 30 above its resonance frequency, where the tip-sample distance, d, is modulated by the oscillator amplitude, a, at the resonance frequency, $\omega_k$. The fast oscillatory motion is virtually unperturbed even if the tip touches the surface and penetrates into the sample owing to the large value of the mode stiffness $C_k$. One can realize that an interaction force probed by a vibrating tip gives rise to a corresponding time-averaged force [see e.g. J. J. Martinez and M. T. Cuberes, Mater. Res. Soc. Symp. Proc. 1085 E, 1085-T05-14 (2008)], which is responsible for a static lever deflection.

Another idea of the experiment described next is to excite sufficiently large oscillation amplitude such that the tip comes out of contact in each oscillation cycle. Thereby, the effect of the adhesion hysteresis is averaged out, leading to a smooth static tip-sample force characteristics and lower overall adhesion. Furthermore, the intermittent contact reduces the effects of sliding friction, similar to conventional dynamic AFM. A virtue of the method is that small vibration amplitudes, on the order of 1 nm, are sufficient for this purpose.

An experimental apparatus that can be used is a home-built AFM 100 using a linearized piezo scanner (Physical Instruments P-733-2D), which allows raster scan imaging of areas of up to 30×30 µm$^2$ at a scan speed of up to 0.3 mm/s.

In reference to FIG. 2, the cantilever sensor includes a body 102 and an end section 104, wherein the end section is designed for sensing a material surface, that is, it includes the tip 120.

Furthermore, the end section is flexible with respect to the body; that is a flexible hinge section 103 is provided, which leads to both the first and the second spring behaviors, as to be explained in more details as follows.

The cantilever sensor can be made of silicon Si, see H. Pozidis, W. Haeberle, D. W. Wiesmann, U. Drechsler, M. Despont, T. Albrecht, and E. Eleftheriou, IEEE Trans. Magn., 40, 2531 (2004).

It may further include a capacitive element 106, that is a platform, for applying and modulating a potential between this element and the material surface (or an underlying layer if the material is a dielectric), via suitable excitation means. Modulation of an applied potential can be by any of several known methods. The modulation occurs at a frequency associated with a higher-order resonant mode of the cantilever sensor.

In an embodiment, the cantilever sensor may include a resistive read sensor made of low-doped Si for thermoelectrically measuring the relative position of the tip with respect to the sample [see e.g. H. Pozidis, W. Haeberle, D. W. Wiesmann, U. Drechsler, M. Despont, T. Albrecht, and E. Eleftheriou, IEEE Trans. Magn., 40, 2531 (2004), and H. Rothuizen, M. Despont, U. Drechsler, C. Hagleitner, A. Sebastian, and D. Wiesmann, Proc. IEEE 22nd Int'l Conf. on Micro Electro Mechanical Systems "MEMS 2009," Sorrento, Italy (IEEE, 2009), pp. 603-606].

A suitable soft response is, for instance, obtained with a spring constant C>0.1 N/m, using a flexible hinge section 103 having a thickness of >170 nm at the base of the end section 104 of the cantilever; the thickness of the rest of the end section being >450 nm. The body 102 can, for example, have the same or greater thickness. The length of the end section is >65 µm, and the resonance frequency of the fundamental bending mode is accordingly >50 kHz. More specifically, suitable spring constants associated to the first spring behavior are less than 1 N/m. The effective spring constants associated to the second spring behavior are 10 N/m or more, for better results.

The Si tip 120 of 500 nm height has an apex radius of >5 nm, and is placed at the center of a connecting structure 107 between the capacitive platform 106 and a U-shaped support 108 of the read sensor.

Referring now to FIG. 3, a schematic of the operated AFM 10 is represented, wherein a resistance of the read sensor 110 is measured via the heater current using a virtual ground current to voltage converter 105. The latter also clamps the capacitive platform 106 to ground potential, as shown. The thermal time constant of the reader is e.g. 10 µs and the overall noise level corresponds to a 0.05 $nm_{rms}$ resolution of the tip-sample distance measurement 300.

The high-order resonant modes can also be electrostatically excited via suitable excitation means. For instance, a radio frequency (RF) generator 200 can be inductively coupled to the sample voltage bias 150, for example, by means of a high-bandwidth ferrite core transformer. More generally, any electromagnetic excitation means can be used, as can a piezo-electric element.

An example of a sample investigated is a 100 nm thick polystyrene film 50, which was spin coated onto a Si wafer (not represented). The polystyrene is of atactic nature with a mean molecular weight of 500 kDa. As has been previously shown [see B. Gotsmann and U. Duerig, Langmuir, 20, 1495 (2004)], uncrosslinked polystyrene films exhibit strong surface wear with clear ripple patterns emerging already in the first scan image. Accordingly, it is an ideal test sample for studying the effectiveness of the present (non-invasive) imaging scheme.

In the experiment, the tip 120 is positioned at a rest position 300 nm above the sample surface 52 using a positioning stage. The tip is moved towards the sample by applying a potential between the sample 50 and the platform 106. As soon as the tip touches the sample surface, the lever bending virtually stops because of the pivoting action of the tip. This point can readily be detected by a distinct change of the slope in a plot of the reader signal versus the applied sample potential. After contact has occurred, the reader signal measures the penetration of the tip into the polystyrene film as the load is increased.

The nominal applied load is the difference between the applied electrostatic force and the force at the contact point. The reader signal is calibrated using the closed-loop-controlled z-piezo positioning stage as reference. This in turn allows the electrostatic force to be calibrated from the approach characteristics and the static lever spring constant. The latter can, for instance, be inferred from finite-element (FE) modeling, using electron microscopy measurements as input.

A substantial amount of negative load, termed pull-off force, is applied in this case to overcome the tip adhesion and release the tip from the surface. The pull-off force is significantly reduced if a high-frequency dither mode is excited by applying an RF voltage at the corresponding mode frequency. In other words, the pull-off force applied to the cantilever sensor is to overcome the average, residual attractive force resulting from the modulation of the interaction of the sensor and the material surface.

The actual excitation amplitude supplied to the sample depends on the oscillator frequency because of the high pass filter characteristics of the coupling transformer. The dithering voltage is smaller than the sample bias voltage, which is >3 V, which provides the pull-in force. Therefore, second harmonic generation due to the quadratic nature of the electrostatic force is negligible.

Four strong, active dithering modes at 0.38, 0.93, 1.79, and 2.28 MHz were identified. The broad mode responses, corresponding to low Q-factors (on the order of 5 to 10), were attributed to the squeezed layer damping of the air cushion between lever and sample. The first mode couples best to the capacitive platform. However, considering the transfer characteristics of the experiment, all four modes were found to be excited with approximately the same efficiency in terms of the applied RF signal.

The Q-factor is defined here as $f_0/\Delta f$, where $f_0$ is the resonance frequency of the mode and $\Delta f$, is the FWHM of the resonance peak in the frequency domain. In this respect, suitable (i.e. low) Q-factors can be obtained when the cantilever sensor end section has an area greater than 25 $\mu m^2$ and/or terminated by a tip having a height less than 5 $\mu m$, and preferably less than 1 $\mu m$. The specific combination wherein the cantilever area is of 25 $\mu m^2$ and the tip has a height of 5 $\mu m$ yields Q-factors on the order of 5.

The FE analysis actually reveals a total of 23 normal modes in the frequency range between 100 kHz and 3 MHz. However, most of them couple only weakly to a vertical tip motion. In particular torsion modes provide only in-plane motion of the tip apex and no measurable dithering effect is observed for these modes. The mode stiffness $C_k$ was found to be more than two orders of magnitude larger than the static spring constant of the lever, even for the lowest resonant mode, and to increase rapidly with increasing mode frequency.

The stiffness $C_k$ is determined from the FE analysis by calculating the resonance frequency shifts $\Delta\omega_k$ obtained by adding a spring load of $C_t \ll C_k$ at the tip and using the equation:

$$C_k/(C_t+C_k)=\omega_k^2/(\omega_k+\Delta\omega_k)^2,$$

from which one obtains:

$$\begin{aligned}C_k &= C_i\omega_k/(2\Delta\omega_k + \Delta\omega_k^2)\\ &= C_i\omega_k/(2\Delta\omega_k) + O((\Delta\omega_k/\omega_k)^2)\\ &\approx C_i\omega_k/(2\Delta\omega_k),\end{aligned}$$

where $\omega_k$ denotes the resonance frequency of the unperturbed mode.

Figure 4:
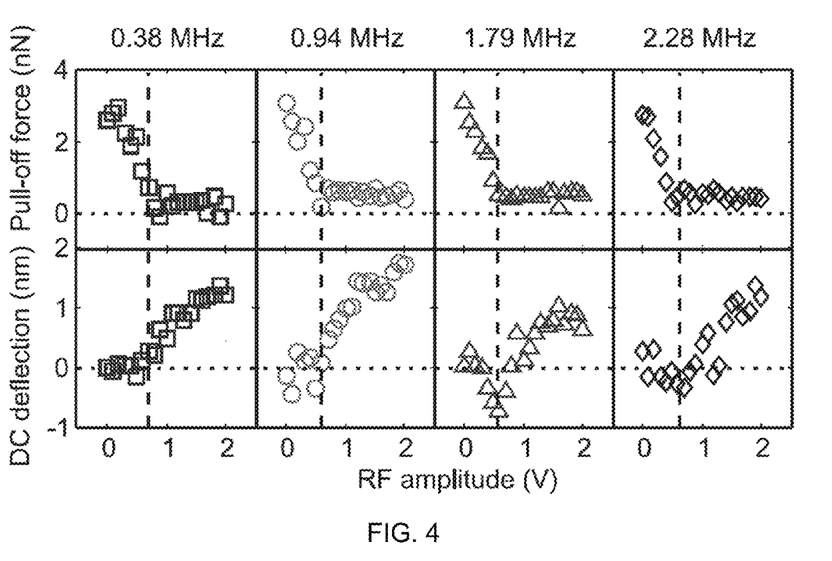
FIGS. 4 and 5 are experimental results obtained according to specific embodiments of the invention.

The top-row panels in FIG. 4 show the pull-off force at resonance, as a function of the RF signal amplitude for the resonance of the four modes evoked earlier. The common feature is the rapid decrease and subsequent saturation at a 10% fraction of the initial value of the measured pull-off force. The bottom-row panels of FIG. 4 show the tip position with respect to the sample surface, termed DC deflection, as measured from the thermal sensor signal. The sample surface is defined as the position of the tip at contact with zero dither excitation applied. The DC deflection exhibits a complementary behavior, staying at a constant zero value for low RF amplitudes and rising in proportion to the RF amplitude as soon as pull-off force saturation sets in. The positive DC deflection corresponds to a retraction of the mean tip position from the sample, suggesting that the vibrating tip floats above the surface.

This happens when the vibration is sufficiently strong to break the adhesive contact in every oscillation cycle and the tip is levitated above the surface by short contact force pulses at closest approach of the oscillation cycle. Correspondingly, the DC deflection is a direct measure for the physical oscillation amplitude of the dithering mode. This interpretation is supported by a parallel theoretical analysis based on contact mechanics which reproduces all observed experimental features with compelling quantitative accuracy. In particular, a theoretical model has been developed which correctly reproduces the experimental observations, namely a sharp drop of the pull-off force with increasing high-frequency mode excitation, followed by a shift of the operating point, which manifests itself as a lever bending away from the surface. It can further be shown, within the same model, that small oscillation amplitude on the order of 1 nm is sufficient to achieve wear-less imaging conditions resulting from breaking the tip-sample contact in each oscillation cycle. Furthermore, subsequent analysis corroborates the notion that the stiff high-frequency mode vibration allows the tip-sample interaction to be probed in a distance-controlled mode which is decoupled from the highly compliant static lever response. As a result, floating tip conditions can be realized in which the tip is levitated 1 nm above the surface by short force pulses in the low megahertz range.

Reverting to FIG. 4, the dashed lines indicate the transition to a floating tip regime for sufficiently high mode excitation, such that the adhesion neck is broken in each cycle of the dither oscillation.

Figure 5:
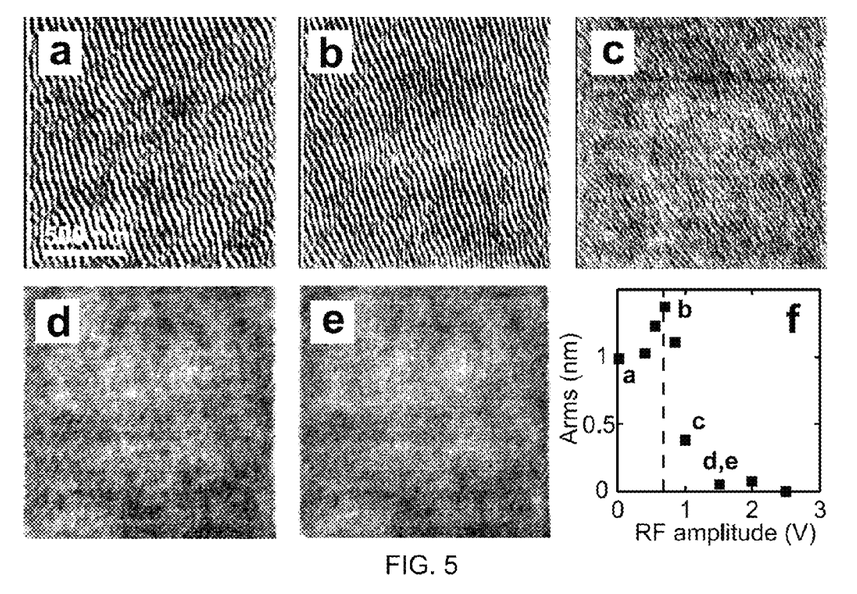

Next, FIG. 5 displays that high-frequency dithering leads to a dramatic reduction of surface wear, which enables contact force imaging of delicate surfaces. Panels (a) to (d) in FIG. 5 show the surface topography of the polystyrene sample as recorded in the first scan with increasing excitation of the dithering mode at 2.28 MHz.

The images were recorded with a nominal tip load of 1 nN. No force feed-back control was used during imaging. Each image, covering an area of 1.5 $\mu m \times 1.5$ $\mu m$, is composed of 1800 lines and 1800 pixels per line recorded at a 20 $\mu s$ sampling period per pixel, which corresponds to a line and pixel pitch of 0.83 nm and a scan speed of 0.04 mm/s.

As reported in the literature [see e.g. O. M. Leung and C. Goh, Science 25, 64 (1992), R. Kaneko and E. Haada, Wear 162-164, 370 (1993) and Z. Elkaakour, J. P. Aime, T. Bouhacina, C. Odin, and T. Masuda, Phys. Rev Lett. 73, 3231 (1994)], strong rippling is observed if no dithering is applied, see FIG. 5, panel a. The rippling wear actually increases for small amounts of dithering and reaches a maximum just at the transition to tip floating, FIG. 5, panel b. Beyond this point, surface rippling is efficiently quenched as demonstrated in panels c and d. The panel e shows the same area as in panel d after 10 consecutive scans. Thus, it is demonstrated that the surface wear of soft samples can be effectively eliminated with at least an embodiment of the present dithering method.

The results of a quantitative wear analysis are shown in panel f. The root mean square ripple amplitude, $A_{rms}$ (in nm), is evaluated by integrating the roughness spectra in the spectral range where the ripple mode is dominant, namely the interval from 0.004 $nm^{-1}$ to 0.04 $nm^{-1}$, and subtracting the intrinsic surface roughness due to capillary wave excitations, $A_{int}$=0.2 $nm_{rms}$. The latter produce a roughness spectrum which is inversely proportional to the square of the wave number, as can be deduced from D. Pires, B. Gotsmann, F. Porro, D. Wiesmann, U. Duerig, and A. Knoll, Langmuir, 25, 5141 (2009). This property is indeed observed if high dithering amplitude is used for imaging, as done in panels d and e, thus proving that the polymer surface is reproduced in its native state.

In summary, it is demonstrated a wear-less contact force imaging of a soft polymer surface using a high-frequency dithering method by exciting high-order resonant modes of the cantilever sensor. The cantilever sensor is designed to have a low static deflection spring constant (on the order of 0.1 N/m) which allows the imaging of surfaces without active force feedback, thus facilitating high-speed scanning. The fact that no ripples are formed implies that shear type forces are effectively eliminated by exciting a second spring behavior, stiffer than the first one.

Hence, this methodology can be used for fast raster scan imaging under low load conditions of delicate samples in general, which opens up new perspectives for noninvasive probe microscopy.

While the present invention has been described with reference to certain embodiments, it will be understood by those skilled in the art that various changes can be made and equivalents can be substituted without departing from the scope of the present invention. In addition, many modifications can be made to adapt a particular situation to the teachings of the present invention without departing from its scope. Therefore, it is intended that the present invention not be limited to the particular embodiment disclosed, but that the present invention will include all embodiments falling within the scope of the appended claims. For example, the spring behaviors invoked throughout are typically provided by, on the one hand, a fundamental resonant bending mode of the cantilever sensor and, on the other hand, one higher resonant mode or more of the sensor. In other words, a dual cantilever is relied upon. It remains that virtual springs can be associated to the said behaviors, so that a variant to the cantilever sensor could be to use a sensor including two springs in series, e.g. provided by two hinge sections of distinct thicknesses.

What is claimed is:

1. A method for scanning a surface of a material with a scanning probe microscope (SPM), said SPM having a cantilever sensor, the method comprising:
   operating said SPM in contact mode, whereby the cantilever sensor is scanned on said material surface and has a first spring behavior excited at a first resonance frequency by a deflection of said sensor by said material surface; and
   exciting a second, stiffer spring behavior at a different resonance frequency from the first resonance frequency during the scanning to modulate an interaction of said sensor and said material surface, wherein said sensor remains in contact with said material surface and the modulation dynamically adjusts contact forces throughout operation.

2. The method according to claim 1, wherein said cantilever sensor is configured such that said deflection by said material surface while operating in contact mode substantially excites a fundamental mode of flexure of said cantilever sensor, thereby providing said first spring behavior, and said step of exciting comprises exciting substantially one higher-order resonant mode or more of flexure of said cantilever sensor, thereby providing said second spring behavior.

3. The method according to claim 2,
   wherein said cantilever sensor has a body and an end section,
   wherein said end section is designed for sensing said material surface and exhibiting flexibility with respect to said body to provide both said first and said second spring behaviors.

4. The method according to claim 3,
   wherein said end section comprises a capacitive element, and
   wherein said step of exciting said second spring behavior comprises applying and modulating a potential between said capacitive element and at least one of said material and an underlying layer, via said excitation means, and at a frequency associated with said higher-order resonant mode.

5. The method according to claim 4, wherein at said step of exciting said excitation means comprises a radio frequency generator inductively coupled to a bias voltage applied to said material.

6. The method according to claim 5, wherein said inductive coupling is by means of a high-bandwidth ferrite core transformer.

7. The method according to claim 4, wherein said end section has a read sensor subsection, said read sensor being adapted for thermoelectrically measuring relative motion of said cantilever sensor with respect to said material surface.

8. The method according to claim 4, wherein said cantilever end section is terminated by a tip, and said end section area and said tip height are selected to have a Q-factor between 5 and 10.

9. The method according to claim 8, wherein said cantilever end section has an area greater than 25 $\mu m^2$.

10. The method according to claim 8, wherein said tip height is less than 5 µm.

11. The method according to claim 2, wherein a spring constant associated with said first spring behavior is less than 1 N/m, and a spring constant associated with said second spring behavior is greater than 10 N/m.

12. The method according to claim 2, wherein said step of exciting is performed by a method selected from the group consisting of electromagnetic and piezo-electric.

13. The method according to claim 2, wherein operating in contact mode further comprises: applying a pull-off force to said cantilever sensor in order to overcome an average, residual attractive force, resulting from said modulation of the interaction of said sensor and said material surface.

14. The method according to claim 2, wherein said cantilever sensor comprises a first spring and a second spring in series, providing respectively said first and said second spring behaviors, said second spring having a larger spring constant than said first spring, said spring constant associated with said first spring being less than 1 N/m and said spring constant associated with said second spring being greater than 10 N/m.

15. A scanning probe microscope (SPM), capable of operating in contact mode, comprising:
   a cantilever sensor having a first spring behavior and a second, stiffer spring behavior, wherein said first spring behavior is excited at a first resonance frequency into a fundamental mode upon deflection of said sensor when scanning a material surface in contact mode,
   wherein said second, stiffer spring behavior is excited at a higher order different resonance frequency from the first resonance frequency during the scanning to modulate an interaction of said sensor and said material surface, wherein said sensor remains in contact with said material surface and the modulation dynamically adjusts contact forces throughout operation.

16. The SPM according to claim 15, wherein said cantilever sensor has a body and an end section, said end section being designed for sensing said material surface and said end section being flexible with respect to the body, such as to provide both said first and said second spring behaviors.

17. The SPM according to claim 16, wherein said SPM is an atomic force microscopy apparatus.

18. A method for scanning a surface of a material with a scanning probe microscope (SPM), said SPM having a cantilever sensor configured to exhibit both a first spring behavior and a second, stiffer spring behavior, the method comprising:
   operating said SPM in contact mode, whereby said sensor is scanned on said material surface and said first spring behavior is excited at a first resonance frequency by a deflection of said cantilever sensor by said material surface exciting a fundamental mode of flexure of said cantilever sensor; and
   exciting said second, stiffer spring behavior at a different resonance frequency from the first resonance frequency during the scanning to modulate an interaction of said sensor and said material surface, wherein said sensor remains in contact with said material surface and the modulation dynamically adjusts contact forces throughout operation,
   wherein a spring constant associated with said first spring behavior is less than 1 N/m, and a spring constant associated with said second spring behavior is greater than 10 N/m,
   wherein said cantilever sensor has a body and an end section,
   wherein said end section is designed for sensing said material surface and exhibiting flexibility with respect to said body, such as to provide both said first and said second spring behaviors,
   wherein said end section comprises a capacitive element,
   wherein said step of exciting said second spring behavior comprises applying and modulating a potential between said capacitive element and at least one of: said material and an underlying layer, and at a frequency associated with said higher-order resonant mode,
   wherein at said step of exciting comprises a radio frequency generator inductively coupled by means of a high-bandwidth ferrite core transformer to a bias voltage applied to said material,
   wherein said end section has a read sensor subsection, said read sensor being adapted for thermoelectrically measuring relative motion of said cantilever sensor with respect to said material surface,
   wherein said cantilever end section is terminated by a tip, and said end section area and said tip height are selected to have a Q-factor between 5 and 10.

* * * * *